(12) United States Patent
Clark et al.

(10) Patent No.: US 11,112,544 B2
(45) Date of Patent: Sep. 7, 2021

(54) TRUNCATED BEADFILM CONSTRUCTIONS AND METHODS OF MAKING THE SAME

(71) Applicant: 3M INNOVATIVE PROPERTIES COMPANY, St. Paul, MN (US)

(72) Inventors: John C. Clark, Maplewood, MN (US); John J. Gagliardi, Hudson, WI (US); Kevin W. Gotrik, Hudson, WI (US); Alexander J. Kugel, Woodbury, MN (US); Jean A. Tangeman, Minneapolis, MN (US); Christopher B. Walker, Jr., St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 90 days.

(21) Appl. No.: 16/323,281

(22) PCT Filed: Aug. 3, 2017

(86) PCT No.: PCT/US2017/045209
§ 371 (c)(1),
(2) Date: Feb. 5, 2019

(87) PCT Pub. No.: WO2018/031355
PCT Pub. Date: Feb. 15, 2018

(65) Prior Publication Data
US 2020/0189226 A1    Jun. 18, 2020

Related U.S. Application Data

(60) Provisional application No. 62/374,387, filed on Aug. 12, 2016.

(51) Int. Cl.
*B32B 3/26*    (2006.01)
*B32B 7/12*    (2006.01)
(Continued)

(52) U.S. Cl.
CPC ............ *G02B 5/128* (2013.01); *B32B 3/26* (2013.01); *B32B 5/16* (2013.01); *B32B 7/12* (2013.01);
(Continued)

(58) Field of Classification Search
None
See application file for complete search history.

(56) References Cited

U.S. PATENT DOCUMENTS

| 2,407,680 A | 9/1946 | Palmquist |
| 3,790,431 A | 2/1974 | Tung |

(Continued)

FOREIGN PATENT DOCUMENTS

| CN | 1249704 | 4/2000 |
| CN | 1639625 | 7/2005 |

(Continued)

OTHER PUBLICATIONS

Miller, "A New Derivation of Post Gel Properties of Network Polymers", Macromolecules, Mar. 1976, vol. 9, No. 2, pp. 206-211.

(Continued)

*Primary Examiner* — Cheng Yuan Huang
(74) *Attorney, Agent, or Firm* — Julie Lapos-Kuchar

(57) ABSTRACT

Described herein is a construction comprising a microsphere layer comprising a plurality of microspheres, wherein the microspheres comprise glass, ceramic, and combinations thereof; a bead bonding layer, wherein the plurality of microspheres is partially embedded in the bead bonding layer forming a first surface comprising exposed microspheres, wherein the plurality of microspheres on the first surface are truncated. Also disclosed herein are articles comprising the construction and methods of making thereof.

20 Claims, 1 Drawing Sheet

(51) Int. Cl.
  *B32B 27/38* (2006.01)
  *B32B 27/34* (2006.01)
  *B32B 27/40* (2006.01)
  *B32B 9/00* (2006.01)
  *B32B 27/30* (2006.01)
  *B32B 17/10* (2006.01)
  *B32B 27/32* (2006.01)
  *B32B 27/36* (2006.01)
  *G02B 5/128* (2006.01)
  *B32B 27/20* (2006.01)
  *B32B 5/16* (2006.01)
  *B32B 27/14* (2006.01)

(52) U.S. Cl.
  CPC ........ *B32B 17/10018* (2013.01); *B32B 27/14* (2013.01); *B32B 27/20* (2013.01)

(56) References Cited

U.S. PATENT DOCUMENTS

| | | | |
|---|---|---|---|
| 4,255,164 A | 3/1981 | Butzke | |
| 4,415,512 A | 11/1983 | Torobin | |
| 4,576,612 A | 3/1986 | Shukla | |
| 4,644,703 A | 2/1987 | Kaczrnarek | |
| 4,733,502 A | 3/1988 | Braun | |
| 4,773,920 A | 9/1988 | Chasman | |
| 4,849,265 A | 7/1989 | Ueda | |
| 5,014,468 A | 5/1991 | Ravipati | |
| 5,587,434 A | 12/1996 | McCullough, Jr. | |
| 5,888,119 A | 3/1999 | Christianson | |
| 6,040,044 A | 3/2000 | Takahashi | |
| 6,355,302 B1 | 3/2002 | Vandenberg | |
| 8,420,217 B2 | 4/2013 | Johnson | |
| 2009/0246439 A1 | 10/2009 | Kanno | |
| 2015/0010723 A1* | 1/2015 | Krishnan | G02B 5/128 428/40.2 |
| 2015/0016038 A1 | 1/2015 | Niu | |
| 2015/0343502 A1 | 12/2015 | Clark | |
| 2016/0096195 A1 | 4/2016 | Barnes | |

FOREIGN PATENT DOCUMENTS

| | | |
|---|---|---|
| CN | 104159741 | 11/2014 |
| CN | 105807346 | 7/2016 |
| EP | 0650803 | 5/1995 |
| HU | 101314684 | 12/2008 |
| HU | 101319113 | 12/2008 |
| JP | 2010182862 | 8/2010 |
| WO | WO 98/39142 | 9/1998 |
| WO | WO 2003/075085 | 9/2003 |
| WO | WO 2011-106484 | 9/2011 |
| WO | WO2013/126361 | 8/2013 |
| WO | WO 2014-100335 | 6/2014 |
| WO | WO 2015-123526 | 8/2015 |
| WO | WO 2016-130172 | 8/2016 |

OTHER PUBLICATIONS

International Search Report for PCT International Application No. PCT/US2017/045209, dated Nov. 6, 2017, 5 pages.

* cited by examiner

TRUNCATED BEADFILM CONSTRUCTIONS AND METHODS OF MAKING THE SAME

CROSS REFERENCE TO RELATED APPLICATIONS

This application is a national stage filing under 35 U.S.C. 371 of PCT/US2017/045209, filed Aug. 3, 2017, which claims the benefit of U.S. Application No. 62/374,387, filed Aug. 12, 2016, the disclosure of which is incorporated by reference in its/their entirety herein.

TECHNICAL FIELD

A microsphere-coated sheet having truncated microspheres is described along with methods of making the same.

SUMMARY

The present disclosure is directed towards providing a construction having a durable surface with reduced haze and/or improved clarity; and/or a low cost, durable article having desirable tactile properties; and methods of making such constructions.

In one aspect, a construction is provided comprising: a microsphere layer comprising a plurality of microspheres, wherein the microspheres comprise glass, ceramic, and combinations thereof; a bead bonding layer, wherein the plurality of microspheres is partially embedded in the bead bonding layer forming a first surface comprising exposed microspheres, wherein the plurality of microspheres on the first surface are truncated.

In yet another aspect, a method of making construction is provided comprising:

(i) obtaining a bead film comprising a microsphere layer comprising a plurality of microspheres, wherein the microspheres comprise glass, ceramic, and combinations thereof; and a bead bonding layer, wherein the plurality of microspheres is partially embedded in the bead bonding layer forming a first surface comprising exposed microspheres; and (ii) abrading the first surface to truncate the plurality of microspheres on the first surface.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Figure 1:
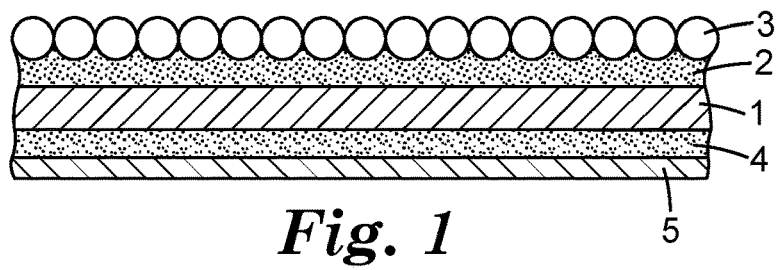
FIG. 1 is a cross-sectional view of a bead film of the prior art.

FIG. 1 is an illustration of a cross-section of a prior art beadfilm article taken from FIG. 1 in U.S. Pat. No. 4,849,265 (Ueda et al.). The beadfilm comprises bead layer 3 attached to substrate 1 via an adhesive layer. Also shown is pressure-sensitive adhesive layer 4 disposed between substrate 1 and release paper 5.

Figure 2:
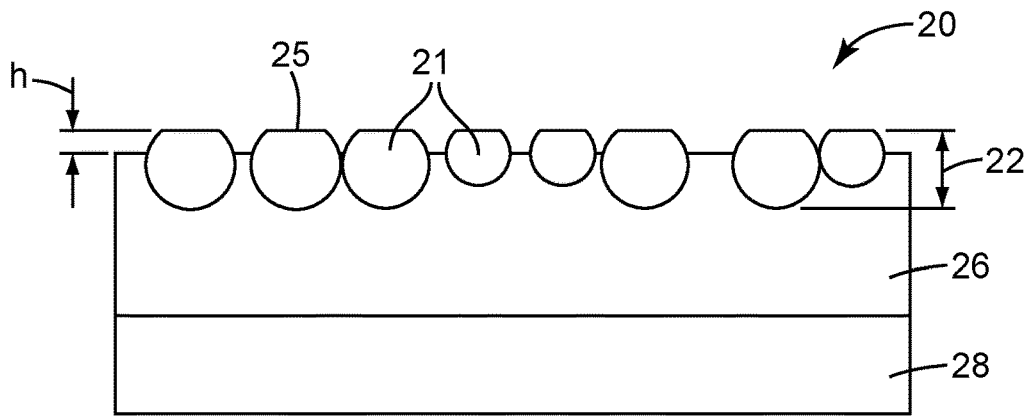
FIG. 2 is a cross-sectional view of a construction according to one embodiment of the present disclosure.

FIG. 2 is an illustration of the construction of the present disclosure, wherein a plurality of microspheres along first surface 25 are truncated. Construction 20 comprises microsphere layer 22, which comprises a plurality of microspheres 21. The plurality of microspheres are partially embedded into bead bonding layer 26. Bead bonding layer 26 is disposed onto optional substrate 28, opposite first surface 25. Also shown in FIG. 2 is "h" which is the distance between the surface of bead bonding layer 26 and the truncated top of the microsphere.

U.S. Pat. Publ. No. 2015/0016038 (Niu et al.) describes an electronic device with a reduced friction surface. The reduced friction surface comprises a glass beaded film where the glass beads are arranged so that they line up in a common plane. U.S. Pat. Publ. No. 2016-0096195 (Barnes et al.) describes a bead coated sheet that has a low friction surface. The surface comprises glass microbeads that are partially embedded in a metal surface where the glass microbeads are greater than 20 micrometers in diameter. It is disclosed that smooth-to-touch surfaces can be made by decreasing the difference in height of the apex of each glass microbead such that they are within 5, 10, 12, 15 or even 20 micrometers. In one embodiment of the present disclosure, it has been discovered that by truncating a plurality of microspheres in a bead film, a bead film having desirable tactile properties, such as low friction or smooth-to-touch, could be achieved more cost effectively Alternatively or additionally, in one embodiment, a durable surface with reduced haze and/or improved clarity can be achieved. Such surfaces may be advantageously used as flexible, durable films to replace glass sheets.

The constructions of the present disclosure, may or may not be retroreflective. In one embodiment, constructions of the present disclosure are not retroreflective, meaning that have a coefficient of retroreflection of less than or equal to 1.0 candelas/lux/square meter. In some preferred embodiments, the presently disclosed constructions have a coefficient of retroreflection of less than or equal to 0.5 candelas/lux/square meter. In some more preferred embodiments, the presently disclosed constructions have a coefficient of retro reflection of less than or equal to 0.1 candelas/lux/square meter.

Substrate Layer

Examples of suitable substrate layers include but are not limited to those selected from at least one of films, glass, optically clear adhesives, fabrics (including synthetics, non-synthetics, woven and non-woven such as nylon, polyester, etc.), polymer coated fabrics such as vinyl coated fabrics, polyurethane coated fabrics, etc.; leather; metal; paint coated metal; paper; polymeric films or sheets such as polyethylene terephthalate, acrylics, polycarbonate, polyurethane, elastomers such as natural and synthetic rubber, and the like; and open-cell foams and closed cell foams, including for example, polyurethane foam, polyethylene foam, foamed rubber, and the like. The substrates may, for example, be in the form of a clothing article or footwear; automobile, marine, or other vehicle seat coverings; automobile, marine, or other vehicle bodies; orthopedic devices; electronic devices (including, for example, displays, track pads, and outer surface cover), hand held devices, household appliances; sporting goods; and the like.

In one embodiment, the substrate layer is a thermoformable material, which can enable thermoforming of the resulting construction. The thermoformable material should have a glass transition temperature below the thermoforming temperature. In one embodiment, the substrate comprises a material having a glass transition temperature greater than or equal to 60° C., 70° C., or even 80° C.; and less than or equal to 160° C., 150° C., 140° C., 130° C., 120° C., or even 110° C.

In one embodiment, the substrate has a thickness of at least 5, 10, 20, 25, 50 or even 75 micrometers. In one embodiment, the substrate has a thickness of at most 25 mm or even 50 mm.

Bead Bonding Layer

The plurality of microspheres are held in place on top of the substrate via a bead bonding layer. The bead bonding layer is typically an organic polymeric material. The bead bonding layer should exhibit good adhesion to the microspheres. It is also possible that an adhesion promoter for the microspheres could be added directly to the bead bonding layer itself as long as it is compatible within the process window for disposing the bead bonding layer on the surfaces of the microspheres.

Materials useful in the bead bonding layer include, but are not limited to those selected from at least one of polyurethanes, polyesters, acrylic and methacrylic acid ester polymers and copolymers, epoxies, polyvinyl chloride polymers and copolymers, polyvinyl acetate polymers and copolymers, polyamide polymers and copolymers, fluorine containing polymers and copolymers, silicones, silicone containing copolymers, elastomers, including synthetic and natural rubbers such as neoprene, acrylonitrile butadiene copolymers, polymer matrix composites, and combinations thereof. In some embodiments, the polymer matrix composites include nanoparticles in resins, fibers in resins, and the like. Combinations can include any combinations of materials, such as interpenetrating networks, dual cure systems, and the like.

In one embodiment of the present disclosure, the bead bonding layer of the present disclosure comprises at least one of (i) a resin comprising a fluorine-containing polymer, (ii) a linear resin, (iii) a resin having low crosslink densities, (iv) a resin having high crosslink densities, and (v) combinations and blends thereof. As used herein, resin refers to a solid or highly viscous material comprising a polymer, and among other things, additives such as pigments or colorants such as metallic flakes, rheological modifiers, UV stabilizers, antioxidants, etc. Use of such resins in the bead bonding layer can enable stain-resistance and/or thermoforming capabilities to the construction.

For example, a resin having high crosslink densities can impart stain-resistance to the resulting construction. A linear resin or resin having low crosslink densities can be thermoformed, while adding a fluorine-containing polymer (such as for example a linear fluorine-containing polymer such as copolymers made from tetrafluoroethylene, hexafluoropropylene, and vinylidene fluoride) can impart stain resistance. For example, in a dual cure system, a resin having low crosslink densities, and optionally comprising a fluorinated polymer, is thermoformed and a subsequent crosslinking step is used to generate resin having high crosslink densities, which may provide stain-resistance.

In one embodiment, the bead bonding layer resin comprises a fluorine-containing polymer, which can impart stain resistance to the construction. In one embodiment, it has been found that stain resistance characteristics may be related to the amount and location of the fluorine atoms in the fluorine-containing polymer of the bead bonding layer. For example, improved stain resistance may occur when the fluorine atoms are located along the polymer backbone (i.e., the main chain of the polymer). The amount of fluorine atoms present in the polymer may be calculated by taking into account both the weight ratios of the monomers included as well as the fluorine content by weight of each monomer along its polymerizable chain length, including fluorine atoms that are present on those atoms once removed from the polymerizable chain. As an example, a copolymer of tetrafluoroethylene, hexafluoropropylene, and vinylidene fluoride in a weight ratio of 10:40:50 would have a backbone fluorine content of 67.7%. This was calculated as follows.

Tetrafluoroethylene: $C_2F_4$, molecular weight 100.01, monomeric fluorine content 76.0%, weight ratio 10%;
Hexafluoropropylene: $C_3F_6$, molecular weight 150.02, monomeric fluorine content 76.0%, weight ratio 40%;
Vinylidene fluoride: $C_2H_2F_2$, molecular weight 64.03, monomeric fluorine content 59.3%, weight ratio 50%.
$(0.1 \times 0.76) + (0.4 \times 0.76) + (0.5 \times 0.593)] \times 100 = 67.7\%$.

Note that this calculation includes the fluorine atoms on the trifluoromethyl group of hexafluoropropylene since it is only one atom removed from the polymerizable chain of the hexafluoropropylene monomer.

In some embodiments of the present disclosure, the fluorine content along the polymeric backbone of the fluorine-containing polymer is from at least 15%, 20%, 25%, 27%, 30%, or even 40% and at most 76%, 72% or even 70% by weight.

Although there may be fluoropolymer-containing resins which possess the desired fluorine content they may not exhibit the desired level of stain resistance to highly staining materials, such as yellow mustard, at elevated temperature and humidity. Without wishing to be bound by theory, it is believed that those materials in which the fluorine atoms reside solely, or predominately, in pendent side chains or end group do not exhibit the desired stain resistance characteristics of the constructions in one embodiment of the present disclosure. While materials in which the fluorine atoms reside solely, or predominately, in the polymer backbone or within one carbon away from the backbone may provide adequate stain resistance to yellow mustard at elevated temperature and humidity.

In some embodiments, fluorine-containing polymers having certain glass transition temperatures (Tg) are useful in the present disclosure. Without being bound by theory, it is believed that the higher the Tg, the more resistant it is to staining of yellow mustard. For example, in some embodiments, fluorine-containing polymer having a Tg of at least 60° C., 70° C., or even 80° C. are useful in the present disclosure. In some embodiments, fluorine-containing polymers having a Tg of no more than 150° C., or even 100° C. are useful in the present disclosure.

Fluorine-containing polymers useful in the bead bonding layer including, but are not limited, to those selected from at least one of the following: fluoroolefins and fluorourethanes. Fluoroolefins include elastomeric fluoroolefin polymers, thermoplastic fluoroolefin polymers, elastomeric fluoroolefin polymers crosslinked with multifunctional acrylates or multifunctional amines, and thermoplastic fluoroolefin polymers crosslinked with multifunctional amines. Fluorourethanes include crosslinked fluorinated polyurethanes. Any combination of these materials may also be used so long as they are miscible in one another. In some embodiments, fluorine-containing polymers useful in the present disclosure may also include other halogens, such as for, example chlorine. An exemplary fluorine-containing polymer useful in the present disclosure includes chloro trifluoroethylene (CTFE). Any combination of these materials may also be used so long as they are miscible in one another.

Examples of useful elastomeric fluoroolefin polymers include, but are not limited to, bromine-containing copolymers of tetrafluoroethylene, hexafluoropropylene, and vinylidene fluoride such as that available under the trade designation 3M DYNEON PEROXIDE CURE FLUOROELASTOMER FPO 3740 from 3M Company, St. Paul, Minn.; and ultra-low viscosity fluoropolymers such as that obtained as an experimental or developmental product under the trade designation 3M DYNEON FLUOROELASTOMER E-20575 from 3M Company, St. Paul, Minn. Examples of useful thermoplastic fluoroolefin polymers include, but are not limited to, copolymers of tetrafluoroethylene, hexafluoropropylene, and vinylidene fluoride such as that available under the trade designation 3M DYNAMAR POLYMER PROCESSING ADDITIVE FX 5912 from 3M Company, St. Paul, Minn.

The fluorine-containing polymers may be used in a resin to form the bead bonding layer and crosslinked. Examples of useful co-crosslinked fluoropolymers include, but are not limited to, elastomeric fluoroolefins co-reacted with multifunctional acrylates, such as pentaerythritol triacrylate, available under the trade designation SARTOMER SR 344 from Sartomer USA, LLC, Exton, Pa., and trimethylolpropane triacrylate, available under the trade designation SARTOMER SR 351H from Sartomer USA, LLC, Exton, Pa. may also be used. Examples of useful fluoropolymers crosslinked with amines include, but are not limited to, thermoplastic fluoroolefins reacted with multifunctional primary amines such as that available under the trade designation JEFFAMINE T403 from Huntsman Corporation, The Woodlands, Tex. A useful, non-limiting, example of a fluorourethane is that derived from the reaction of a polyfunctional, aliphatic isocyanate resin based on hexamethylene diisocyanate (HDI), such as that available under the trade designation DESMODUR N3300A from Covestro LLC, Pittsburgh, Pa. and a fluorinated polyhydroxy-containing polymer such as that available under the trade designation ZEFFLE GK-570 from Daikin America, Orangeburg, N.Y. In some embodiments, useful non-limiting examples of fluorine-containing polymer include those derived from a solid, copolymer of fluoroethylene and vinyl ether available under the trade designation of LUMIFLON LF-200F from AGC Chemicals America, Exton, Pa. These fluorinated polyhydroxy polymers can be crosslinked for example with isocyanates. In one embodiment, stain resistance of the construction may be achieved by using a bead bonding layer made of a resin having a high crosslink density. As used herein a high crosslink density refers to a resin having a high system functionality using the calculations as discussed in U.S. Pat. No. 8,420,217 (Johnson).

The "System Functionality" is defined as the total moles of equivalents of the reactive groups in a condensation divided by the total moles of the two components. For example, in a polyurethane formation the total moles of equivalents of hydroxyl and isocyanate groups is divided by the total moles of the polyols and the multifunctional isocyanates. In a polyurea formation, the total moles of equivalents of amine and isocyanate groups is divided by the total moles of the polyamines and the multifunctional isocyanates. In order to obtain a resin having a high crosslink density, the system functionality should be greater than 2.4, 3.0, 4.0. 5.0, or even 10, which means it has substantial crosslinking. If the system functionality is 2.0 or less, little or no crosslinking is achieved and the material is typically thermoformable. When the system functionality is between the above mentioned ranges, the resin is lightly crosslinked. Typically, a higher system functionality leads to greater crosslinking and a stiffer system. As used herein "moles of equivalents" refers to the moles of functional groups. Thus, for a polyol it is the moles of equivalents of hydroxyl groups (OH), and for an isocyanate it is the moles of isocyanate groups (NCO). For example, for a diol or diisocyanate, the moles of equivalents would equal two times the moles of the diol or the diisocyanate, respectively. Similarly, for a triol, the moles of equivalents would equal three times the moles of the triol. "Mole fraction of equivalents" for a particular polyol is the ratio of moles of equivalents of that particular polyol divided by the moles of equivalents for all polyols in the combination of polyols. Based on this definition, the sum of the mole fraction of equivalents for all polyols in the combination is 1. The crosslinker has a functionality greater than 2.0, e.g., a functionality of at least 3. In some embodiments, the crosslinker may have a higher functionality, e.g., 4. In some embodiments, the crosslinker is a low molecular weight triol, e.g., glycerol (i.e., propane-1,2,3-triol). Other exemplary crosslinkers include trimethylolpropane, 1,2,6-hexanetriol, and triethanol amine. In some embodiments, a combination of crosslinkers may be used. In some embodiments, the crosslinker is a triisocyanate.

System functionalities of greater than 2.0-2.15 are less crosslinked than those with system functionalities greater than 2.4. Those systems with higher functionality are more crosslinked. The combination of high system functionality with equivalent weight of isocyanate and/or polyols is less than 1000 is preferred for rigid applications.

Generally, the ratio of the moles of equivalents of isocyanate groups over the moles of equivalents of hydroxy groups (NCO/OH) should be approximately 1, e.g., between 0.7 and 1.3, inclusive, and in some embodiments between 0.9 and 1.1, inclusive. If NCO/OH ratio is greater than 1, the crosslink density will increase, leading to higher hardness and lower elongation. If NCO/OH ratio is less than 1, the system will have a lower crosslink density, leading to softer system and greater elongation. Thus, the exact ratio of NCO/OH can be adjusted to obtain desired mechanical properties. In addition, decreasing the NCO/OH ratio tends to make the system more hydrophilic and will typically have greater moisture vapor transmission, which may be desirable in application benefiting from a "breathable" structure.

In some embodiments, it may be desirable to use an NCO/OH ratio of greater than 1 to ensure complete crosslinking. For example, the polyols are typically hygroscopic and may carry water into the system. This water tends to react quickly with available NCO sites making them unavailable for crosslinking with the hydroxy groups of the polyols. In some embodiments, an NCO/OH ratio of at least 1.02, (e.g., between 1.02 and 1.07, inclusive) and in some embodiments, at least 1.04 (e.g., between 1.04 and 1.06, inclusive) may be used.

The resin having a high crosslink density may be derived from an ionizing radiation-curable (such as UV-curable) composition comprising a suitable mixture of prepolymers, oligomers and/or monomers having a polymerizable unsaturated bond(s) or an epoxy group(s) in the molecule thereof.

In one embodiment, the resin is an epoxy resin, wherein it is UV-curable (e.g., cured with onium salts) or alternatively, can be cured with a polyamine hardener. Such epoxies can include 1,3-bis[2-(3,4-epoxycyclohexyl)ethyl]-tetramethyldisiloxane available from Gelest Inc., Morrisville, Pa.

Prepolymers and oligomers include: unsaturated polyesters, such as condensates of unsaturated dicarboxylic acids with polyhydric alcohols, methacrylates, such as polyester methacrylates, polyether methacrylates, polyol methacrylates, and melamine methacrylates: acrylates, such as polyester acrylates, epoxy acrylates, urethane acrylates, polyether acrylates, polyol acrylates, and melamine acrylates; and cationically polymerizable epoxy compounds.

Urethane acrylates include, for example, polyether urethane (meth)acrylates represented by the following general formula which are prepared, for example, by reacting polyether diol with a hydroxyl-containing acrylate and a diisocyanate:

$$CH_2=C(R^1)-COOCH_2CH_2-OCONH-X-$$
$$NHCOO-[-CH(R^2)-(CH_2)_n-O-]_m-$$
$$CONH-X-NHCOO-CH_2CH_2OCOC(R^1)$$
$$=CH_2$$

wherein $R^1$ and $R^2$ each independently represent a hydrogen atom or a methyl group; X represents a diisocyanate residue; n is an integer of 1 to 3; and m is an integer of 6 to 60.

Diisocyanates usable as the polyether urethane (meth) acrylate include, for example, isophorone diisocyanate, dicyclohexylmethane diisocyanate, hexamethylene diisocyanate, diphenylmethane diisocyanate, and tolylene diisocyanate. Polyether diols include polyoxypropylene glycol, polyoxyethylene glycol, and polyoxytetramethylene glycol, these polyether diols having a number average molecular weight of 500 to 3,000 g/mol.

Monomers usable for the formation of the ionizing radiation-curable resin include styrene monomers, such as styrene and α-methylstyrene, acrylic esters, such as methyl acrylate, 2-ethylhexyl acrylate, methoxyethyl acrylate, butoxyethyl acrylate, butyl acrylate, methoxybutyl acrylate, and phenyl acrylate, methacrylic esters, such as methyl methacrylate, ethyl methacrylate, propyl methacrylate, methoxyethyl methacrylate, ethoxymethyl methacrylate, phenyl methacrylate, and lauryl methacrylate, substituted amino alcohol esters of unsaturated substituted acids, such as 2-(N,N-diethylamino)ethyl acrylate, 2-(N,N-dimethylamino)ethyl methacrylate, 2-(N,N-dibenzylamino)methyl acrylate, and 2-(N,N-diethylamino)propyl acrylate, unsaturated carboxylic acid amides, such as acrylamide and methacrylamide, compounds, such as ethylene glycol diacrylate, propylene glycol diacrylate, neopentyl glycol diacrylate, 1,6-hexanediol diacrylate, and triethylene glycol diacrylate, polyfunctional compounds, such as dipropylene glycol diacrylate, ethylene glycol diacrylate, propylene glycol dimethacrylate, and diethylene glycol dimethacrylate, and/or polythiol compounds having two or more thiol groups in a branch thereof, for example, trimethylolpropane trithioglycolate, trimethylolpropane trithiopropylate, and pentaerythritol tetrathioglycol.

A photopolymerization initiator may be added to the ionizing radiation-curable composition along with other additives (such a pigments, stabilizers, etc.). Photopolymerization initiators include acetophenones, benzophenones, Michler's benzoyl benzoate, α-aminoxime ester, tetramethylthiuram monosulfide, thioxanthones, aromatic diazonium salt, aromatic sulfonium salt, and metallocene, n-Butylamine, triethylamine, tri-n-butylphosphine or the like may be further added as a photopolymerization accelerator (a sensitizer). The amount of the photopolymerization initiator added is preferably 1 to 10% by weight from the viewpoint of good curability. The photopolymerization initiator is preferably a benzophenone photopolymerization initiator from the viewpoint of good curability.

The ionizing radiation-curable composition may be cured to form the bead bond layer. The term "ionizing radiation" used herein refers to electromagnetic radiations or charged particle beams which have sufficient energy capable of polymerizing or crosslinking molecules, and generally refers to, for example, ultraviolet light or electron beam. In one embodiment of the present disclosure, the ionizing radiation-curable resin is cured upon exposure to an electron beam to form an electron beam-cured resin having high hardness.

If the presently disclosed constructions are to be thermoformable, it is preferred that the bead bonding layer is not crosslinked (i.e., a linear resin) or are very lightly crosslinked (i.e., a resin having low crosslink densities). With respect to thermoforming an article, lightly crosslinked materials are preferred over highly crosslinked materials because they produce less elastic recovery energy after being deformed in the forming process. Also, lightly crosslinked materials tend to accommodate higher degrees of elongation before failing compared to highly crosslinked materials. In some embodiments, non-crosslinked materials are preferred to give very high degrees of elongation and to withstand deformation at very high temperatures without failing. In some embodiments, lightly crosslinked materials are preferred over non-crosslinked materials to give better resistance to chemicals and resistance to creep and other dimensional instability over time.

Exemplary linear materials include: polyurethanes, polyureas, polyurethane ureas, polyesters, polycarbonate, ABS, polyolefins, acrylic and methacrylic acid ester polymers and copolymers, polyvinyl chloride polymers and copolymers, polyvinyl acetate polymers and copolymers, polyamide polymers and copolymers, fluorine containing polymers and copolymers, silicones, silicone containing copolymers, thermoplastic elastomers, such as neoprene, acrylonitrile butadiene copolymers, and combinations thereof.

Crosslink density is inversely related to the average molecular weight per crosslink point.

In some embodiments for example in the use of acrylates, the cross link density can be calculated as disclosed in U.S. Pat. No. 6,040,044, using the equation:

Average molecular weight between
   crosslinks=molecular weight of whole resin $(m)$/
   number of crosslink points In this equation, the molecular weight of the whole resin is $\Sigma$ (number of moles of each component incorporated× molecular weight of each component), and the number of crosslink points is $\Sigma[2(\text{number of functional groups in each component}-1)\times\text{number of moles of each component}]$.

In another embodiment, the number of crosslink points can be calculated as the density of the crosslink points multiplied by the volume of the material. The density of crosslink points can be calculated using the method described in Macromolecules, Vol. 9, No. 2, pages 206-211 (1976). One case involves step-growth copolymerizations with arbitrary functional groups of type A with some molecules having more than two functional groups per molecule and functional groups type B with molecules all having two functional groups per molecule. In this case, the density of crosslink points joining m chains, denoted $[X_m]$, can be calculated with the equation:

$$[X_m] = \sum_{f_i=m}^{f_k} [A_{f_i}]_0 P(X_{m,f_i})$$

which is equation 49 in the Macromolecules reference. In this equation, $f_i$ is the degree of functionality of a comonomer, $f_k$ is the highest functionality in the system, m ranges from 3 to $f_k$, $[A_{fi}]_0$ is the initial concentration of comonomers with functionality $f_i$, and $P(X_{m,fi})$ is the probability that a monomer of functionality $f_i$ acts as a crosslink point for exactly m chains. The total crosslink density, [X], is the sum of all $[X_m]$ from m=3 to $f_k$. The probability $P(X_{m,fi})$ can be calculated by the equation:

$$P(X_{m,f_i}) = \binom{f_i}{m} P(F_A{}^{out})^{f_i-m} [1 - P(F_A{}^{out})]^m$$

which is equation 45 in the Macromolecules reference, where $P(F_{Aout})$ is the probability that an arbitrary functional group is not chemically bound to a complementary chemical group attached to an infinite polymer network. This probability can be found by numerically solving the equation:

$$rp^2 \Sigma_i a_{f_i} P(F_A{}^{out})^{f_i-1} - P(F_A{}^{out}) - rp^2 + 1 = 0$$

which is equation 22 in the Macromolecules reference. In this equation, p is the reaction conversion of the chemical functionalities of type A, r is the molar ratio of functional groups A to functional group B, and $a_f$ is the mole fraction of functional groups on molecules with functionality f.

Similar equations are taught in the Macromolecules reference that can be used to calculate the number of cross-linking points in other types of chemical systems. These other types of chemical systems include chain addition polymerizations or step-growth copolymerizations involving components having functionality greater than two for two distinct types of functional groups.

In one embodiment, the resins having low cross link densities are those resins comprising lightly crosslinked material having a molecular weight between crosslinks of greater than about 2,800 g/mol, 4,000 g/mol, 10,000 g/mol, 50,000 g/mol, 100,000 g/mol, 200,000 g/mol, 1,000,000 g/mol, or even 20,000,000 g/mol.

The average molecular weight (e.g., number average) per crosslink can be calculated as described above for the highly crosslinked resin. It should be noted that these calculations do not account for moisture introduced into the reaction as a contaminant, which can lower the actual crosslink density compared to the calculated expected crosslink density. In one embodiment, a slight excess of moles of isocyanate functionality can be added relative to the moles of hydroxyl or amine functionality to account for contaminant moisture. Also, these equations do not account for moisture curing that may occur when, for example, excess moles of isocyanate functionality are added relative to the moles of hydroxyl or amine functionality, and this moisture curing can increase the actual crosslink density compared to the expected crosslink density.

In some embodiments, a bead bonding layer may comprise a resin that is able to be thermoformed and enable stain resistance in the resulting construction. Such a bead bonding layer can be derived from an actinic radiation reactive polyurethane dispersion. The bead film made from such an actinic radiation reactive polyurethane dispersion can be thermoformed and then the acrylate functionality cross-linked by exposure to actinic (e.g. UV) radiation after the thermoforming step. Such reactive polyurethanes include those materials sold under the trade designations "BAYHYDROL UV XP" and "BAYHYDROL UV" commercially available from Covestro LLC, Pittsburgh, Pa.; "LUX 250" commercially available from Alberdingk Boley, Greensboro, N.C.; "MIWON MIRAMER WB 2812" commercially available from Miwon Specialty Chemical Co., Ltd., Korea; and "EBECRYL 4150" and "EBECRYL 4250", both commercially available from Allnex.

In one embodiment, the actinic radiation reactive polyurethane is derived from a reaction product of polyester polyol, diisocyanates and/or triisocyanates, and dihydroxy containing carboxylic acid. In some embodiments, a dispersion comprising the actinic radiation reactive polyurethane has a pH of greater than or equal to 6.5. In some embodiments, a dispersion comprising the actinic radiation reactive polyurethane has a pH of less than or equal to 10.0.

In one embodiment, the bead bonding layer comprising the actinic radiation reactive polyurethane includes a thermally-activated crosslinker to crosslink the bead bonding layer. Useful crosslinkers include polyisocyanates, preferably water dispersible polyisocyanates, and polyaziridines. In some embodiments, blends of aziridines and water dispersible isocyanates are possible. Other crosslinkers, such as carbodiimides and blocked isocyanates, may also be used.

In some embodiments, the actinic radiation reactive polyurethane is blended with a multi-functional acrylate. A variety of different multi-functional acrylates are useful. In some embodiments, it is desirable that the multi-functional acrylates have a high level of functionality and relatively lower molecular weight. Exemplary multi-functional acrylates include: ethoxylated trimethylol propane triacrylate, trimethylol propane triacrylate, pentaerythritol tri/tetracrylate, dipentaerythritolhexaacrylate, and tris(2-hydroxy ethyl) isocyanurate triacrylate. While liquid multi-functional acrylates can be used, solid multi-functional acrylates, such as tris(2-hydroxy ethyl) isocyanurate triacrylate, can also be used and used in an actinic radiation reactive polyurethane dispersion. Acrylate functional polyols are also available from Allnex.

The actinic radiation reactive polyurethane dispersion may be cured to form the bead bond layer, which can result in a highly cross-linked bead bond layer, which can impart stain resistance of the resulting construction. Exemplary curing agents include those having latent functionality in that there is at least one type of functionality present in the curing agent that polymerizes in a manner that does not interfere with and is stable in the presence of polymerization of at least one other type of functionality present in the curing agent. For example, curing agents useful in the present disclosure include molecules having at least some functionality useful for condensation curing and at least some functionality useful for free radical polymerization. Condensation polymerizations, such as those using isocyanates, are enhanced by heating. Free radically polymerizable groups, such as (meth)acrylates, are stable within a range of temperatures commonly used for condensation polymerization.

In some embodiments, a photoinitiator is used with the actinic radiation reactive polyurethane. For example, in some embodiments, curing is accomplished by actinic radiation curing of a thermoformed construction. Exemplary actinic radiation curing includes curing by exposure of the thermoformed construction to an ultra violet (UV) light source, an electron beam source, and the like. In some embodiments, curing is accomplished by thermally initiated curing.

In some embodiments, a resin comprising a fluorine-containing polymer and having a high crosslinking density is used as the bead bonding layer, which can impart stain resistance to the resulting construction.

In one embodiment, the bead bonding layer is made comprises pendent hydroxyl groups which can react with polyisocyanates to build molecular weight through condensation polymerization. The resin is also selected to have free radically polymerizable functionality such as (meth)acrylate groups, so that the presently disclosed materials may be thermoformed and then free radically crosslinked to make a thermoset construction. As a result, the surface of the construction becomes more rigid leading to higher pencil hardness values and more crosslinked so that solvents and staining agents are less able to penetrate the surface. The use of fluorine-containing polymers as described above (e.g., polymers comprising fluorine along the polymer backbone or within one carbon atom of the backbone) in combination with the free radical crosslinking leads to resistance to staining by mustard and other colored staining agents.

In some embodiments, the resin comprises a partially fluorinated polymer derived from at least one fluorine containing monomer and two or more non-fluorinated monomers having at least one active hydrogen functional group, where at least one, but not all of the active hydrogen functional groups are reacted with at least one curing agent having latent functionality, and where the curing agent comprises polyisocyanate. Such partially-fluorinated polymers may be derived from the structure of Formula (I):

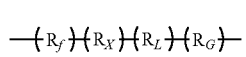   (I)

where $R_f$ must be present as 30 mol % to 60 mol % of the polymer; $R_X$ must be present as 5 mol % to 20 mol % of the polymer; and $R_L$ and $R_G$ comprises the remaining mol % of the polymer. In some embodiments, $R_f$ must be present as 30 mol % to 60 mol % of the polymer; $R_X$ must be present as 5 mol % to 15 mol % of the polymer; and $R_L$ and $R_G$ comprises the remaining mol % of the polymer. Further where $R_f$ in Formula (I) is selected from at least one of the following or combinations thereof:

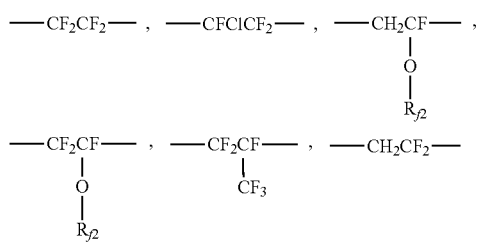

where $R_{f2}$ is fluoroalkyl having 1 to 8 carbon atoms.
And also where $R_X$ in Formula (I) is

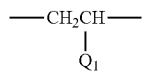

where $Q_1$ is

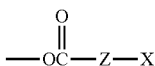

or

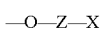

where Z is optional, or when present, is selected from an alkylene, arylene, aralkylene or alkarylene, in which any are optionally substituted with N, O or S; and where X is OH, or SH, or $NHR_1$, where $R_1$ is H, alkyl or cycloalkyl having 1 to 22 carbon atoms.

And also where $R_L$ in Formula (I) is

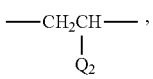

where $Q_2$ is,

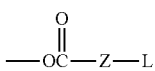

or,

where Z is optional, or when present, is selected from an alkylene, arylene, aralkylene, or alkarylene, in which any are optionally substituted with N, O or S and
L is

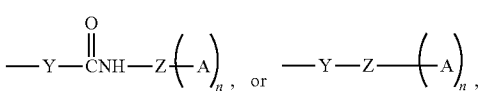

where Y is O, S, $NR_1$, where $R_1$ is H, or alkyl or cycloalkyl having 1 to 22 carbon atoms, and
A is

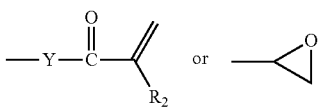

where n is 1 to 5 and $R_2$ is H or $CH_3$.
$R_G$ is

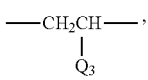

where $Q_3$ is

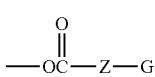

or

—O—Z-G where Z is optional, or when present is selected from an alkylene, arylene, aralkylene, or alkarylene in which any are optionally substituted with N, O or S. and where G is aryl, alkyl, aralkyl or alkaryl.

In any of the foregoing embodiments, units $R_f$, $R_X$, $R_L$, $R_G$ may be arranged head-head, head-tail, tail-head, or tail-tail as in:

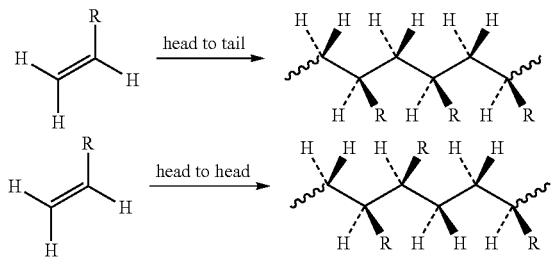

CN 101314684 and CN 101319113, for example, disclose ZEFFLE GK-570 as having a fluorine content of 35-40%. JP 2010182862, for example, discloses ZEFFLE GK-570 as having a fluorine content of 35%.

The resin may include chlorotrifluoroethylene (CTFE) polyhydroxy containing polymers such as those available under the trade designation LUMIFLON from Asahi Glass Chemicals American, Bayonne, N.J. In some embodiments, the resin may include nonfluorinated polyols in addition to fluorinated polyols, as long as they are miscible in solution and in the dried and cured products. The bead bonding resin may include monoalcohols, in limited amounts. The monoalcohol may also possess latent functionality, such as acrylate groups (e.g. hydroxyethylacrylate), or be fluorinated to enhance chemical resistance (e.g. N-methyl, N-butanol perfluorobutanesulfonamide).

The resin as described above may be cured to form the bead bonding layer. Exemplary curing agents include those having latent functionality in that there is at least one type of functionality present in the curing agent that polymerizes in a manner that does not interfere with and is stable in the presence of polymerization of at least one other type of functionality present in the curing agent. For example, curing agents useful in the present disclosure include molecules having at least some functionality useful for condensation curing and at least some functionality useful for free radical polymerization. Condensation polymerizations and/or thermal catalysis, such as those using isocyanates, are enhanced by heating. Free radically polymerizable groups, such as (meth)acrylates, are stable within a range of temperatures commonly used for condensation polymerization. In some embodiments, useful curing agents include those having isocyanate or epoxy functionality combined with (meth)acrylate functionality. Preferable curing agents useful in the present disclosure include those having isocyanate functionality combined with (meth)acrylate functionality. Examples include 1,1-bis(acryloyloxymethyl) ethyl isocyanate (BEI), isocyanatoethyl acrylate (AOI), and isocyanatoethyl methacrylate (MOI), which may be obtained from CBC America Corp, Commack, N.Y., and DESMOLUX D-100, which may be obtained from Allnex, Alpharetta, Ga., and LAROMER 9000 available from BASF. When using polyisocyanates as curing agents, these polyisocyanates may also function as crosslinkers, where crosslinking means having two or more isocyanate groups that are capable of reacting with two different polymeric chains.

These curing agents preferably include latent functionality such that the thermoformable constructions can be converted into thermoset constructions. For example, in some embodiments, curing is accomplished by actinic radiation curing of the thermoformed construction. Exemplary actinic radiation curing includes curing by exposure of the thermoformed construction to an ultraviolet (UV) light source. Various photoinitiators can be used in the presently disclosed thermoformed constructions. In some embodiments, it is preferable to use photoinitiators having longer wavelength absorption. Alternatively, in some embodiments, curing is accomplished by exposure of the thermoformed construction to electron beam irradiation. In some embodiments, curing is accomplished by thermally initiated curing. Photoinitiators useful in the present disclosure include those commercially available under the trade designations "IRGACURE" (e.g. Irgacure 651) and "DAROCURE" (e.g. Darocure 1173) from BASF, Ludwigshafen, Del. and "ESACURE" (e.g. Esacure KB1) from Lamberti, Gallarate, IT. Suitable UV curing apparatus and the light sources are well known to those skilled in the art and include for example those commercially available under the trade designation "Fusion" from Heraus Noblelight Fusion UV, Gaithersburg, Md. Useful crosslinkers include polyisocyanates which are useful for reaction with the microspheres as well as to the pendent hydroxyl groups on the fluorine containing polymer. An examples of such polyisocyanates is given below in Formula (II)

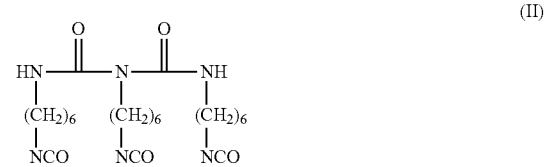

(II)

Exemplary compounds of Formula (II) are commercially available. Exemplary compounds of Formula (II) can be obtained from Covestro LLC (Pittsburgh, USA). One such compound is obtainable under the trade designation DESMODUR N100.

Other exemplary polyisocyanates include those having structures according to the following Formulas (III) and (IV):

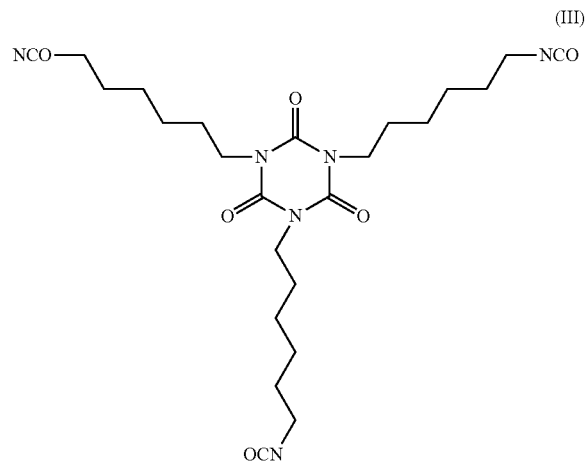

(III)

-continued

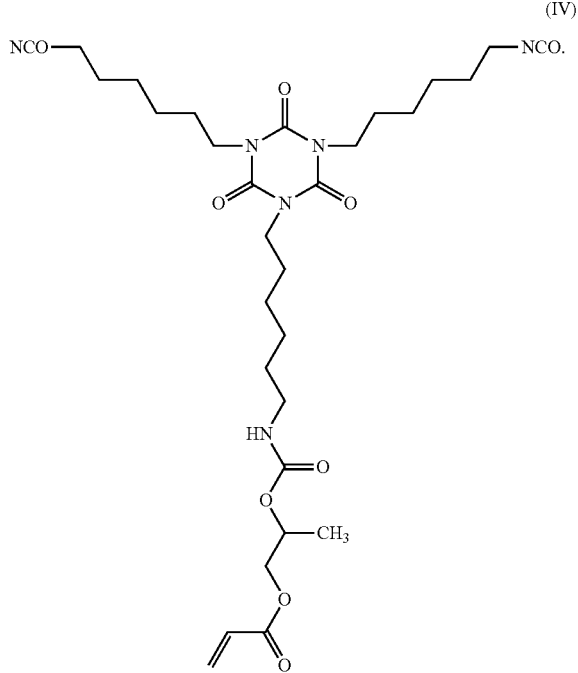

(IV)

Many of the multifunctional isocyanates of greater than 2 functionality, including that of Formula (III), exist as a distribution of materials. For instance, hexamethylene diisocyanate based isocyanate oligomers such as biuret multi-isocyanates (for instance those available under the trade designation DESMODUR N100) exist as a mixture of hexamethylene diisocyanate, hexamethylene diisocyanate biuret trimers, hexamethylene diisocyanate biuret pentamers, hexamethylene diisocyanate biuret heptamers, and so on. The same is true for hexamethylene diisocyanate based isocyanurate multi-isocyanates (for instance those available under the trade designation DESMODUR N3300). Biuret and isocyanurate multi-isocyanates may be based on other diisocyanates such as isophorone diisocyanate, or toluene diisocyanate. Diisocyanates such as H12MDI (available under the trade designation DESMODUR W, Covestro) may also be employed. Other multifunctional isocyanates which are useful as crosslinkers include those with additional acrylate functionality, for example that commercially available under the trade designation DESMODUR D100 (from Covestro, presently commercially available under the trade designation EBECRYL 4150 from Allnex, Alpharetta, Ga.). DESMODUR D100 has an NCO functionality of about 2 and can act as a crosslinker.

In one embodiment, the bead bonding layer comprises a low Tg, flexible 2-part polyurethane comprising polycarbonate polyols, polyester polyols, or polyether polyols. Such materials are discussed in U.S. Prov. Appl. Nos. 61/939,534 (Kugel et al.), 62/115,950 (Walker et al.) and 61/973,357 (Kugel et al.).

In one embodiment, the construction includes an elastic layer coupled with a thermoplastic layer that has a relatively low forming temperature. Polycarbonate and polycarbonate blends, thermoplastic polyurethane (TPU), non-crystalline PET such as amorphous PET or PETG are some exemplary thermoplastics.

In one embodiment, the bead bonding layer includes polyurethane dispersions, two component (or also referred to herein as "2K") urethanes coated from solvent, 100% solids two component urethanes and two layer urethanes.

In some embodiments, the bead bonding layer includes an aliphatic polyurethane polymer comprising a plurality of soft segments, and a plurality of hard segments.

In some embodiments, the soft segments are poly(alkoxy) polyol. In some embodiments, the poly(alkoxy) polyol is preferably essentially free of crosslinker. "Essentially free of crosslinker" as used herein means that there is not an effective amount of crosslinker present in the composition that comprises the bead bonding layer. For example, this may be less than or equal to 1.0 percent by weight of crosslinker based on the total weight of the composition that comprises the bead bonding layer. In some embodiments, the soft segments are polycarbonate polyol. In some embodiments, the soft segments are polyester polyol.

In some embodiments, the specific chemical identities and relative amounts of the hard and soft segments and moieties of the hard and soft segments are sufficient to impart a glass transition temperature of 10° C. or less and a storage modulus that changes less than 15 MPa from 25° C. to 175° C. In some embodiments, the soft segments have a number average molecular weight of less than 10,000 g/mol. In some embodiments, the hard segments are derived from diols having molecular weights of less than 600 g/mol. In some preferred embodiments, the soft segments have a number average molecular weight of less than 10,000 g/mol, and the hard segments are derived from diols having molecular weights of less than 600 g/mol. In some embodiments, the soft segments have a number average molecular weight of at least 500 g/mol. In some preferred embodiments, the soft segments have a number average molecular weight of 500 g/mol to 6,000 g/mol, and more preferably between 500 g/mol to 3,000 g/mol. In some preferred embodiments, the soft segments have a number average molecular weight of 500 g/mol to 6,000 g/mol, and more preferably between 500 g/mol to 3,000 g/mol, and the hard segments are derived from diols having molecular weights of less than 600 g/mol.

In some embodiments, the amount of hard segments is 15 to 85 percent by weight based on the total weight of the composition that comprises the bead bonding layer. In some embodiments, the amount of soft segments is 15 to 85 percent by weight based on the total weight of the composition that comprises the bead bonding layer. In some embodiments, the total amount of the hard and soft segments is at least 80 percent by weight based on the total weight of the composition that comprises the bead bonding layer. In some embodiments, the composition from which the bead bonding layer is derived contains less than 20 percent by weight hard segments and 15 to 90 percent by weight soft segments. In some embodiments, the composition from which the bead bonding layer is derived contains a total amount of hard and soft segments in the polyurethane polymer of at least 80 percent by weight of the polymer.

In an even more preferred embodiment, the amount of hard segments is 15 to 85 percent by weight, the amount of soft segments is 15 to 85 percent by weight, and the total amount of the hard and soft segments is at least 80 percent by weight, the weights being based on the weight of a polyurethane polymer from which the bead bonding layer is derived. In some embodiments, the polyurethane polymer from which the bead bonding layer is derived contains less than 20 percent by weight hard segments and 15 to 90 percent by weight soft segments. In some embodiments, the polyurethane polymer from which the bead bonding layer is derived contains a total amount of hard and soft segments in the polyurethane polymer of at least 80 percent by weight of the polymer.

The weight percent of the hard segment is calculated by adding the weight percent of diols having molecular weights of less than 600 g/mol and the weight percent of the isocyanate components.

In some embodiments, the polyurethane polymer has a change in storage modulus of less than 7 MPa from 25° C. to 175° C. In some embodiments, the polyurethane polymer has a change in storage modulus of less than 5 MPa from 25° C. to 175° C. In some embodiments, the resulting bead bonding layer has a storage modulus at 175° C. of greater than 0.2 MPa. In some embodiments, the resulting bead bonding layer has a storage modulus at 175° C. of greater than 1 MPa. In some embodiments, the resulting bead bonding layer has a storage modulus at 175° C. of greater than 3 MPa.

The bead bonding layer can be formed, for example, out of solution, aqueous dispersion, or 100% solids coating such as via hot melt, extrusion, or reactive coating. Use of solvent coating or aqueous dispersions can provide advantages such as lower processing temperatures which in turn permits the use of materials such as polyethylene in the transfer polymer layer described below. In addition, the use of certain higher boiling solvents may advantageously provide constructions with reduced amounts of entrapped air in the dried and cured bead bonding layer.

The bead bonding layer may be transparent, translucent, or opaque. It may be colored or colorless. The bead bonding layer may, for example, be clear and colorless or pigmented with opaque, transparent, or translucent dyes and/or pigments. In some embodiments, inclusion of specialty pigments, such as for example metallic flake pigments, can be useful.

In one embodiment, the thickness of the bead bonding layer is at least 50% of the average diameter of the microspheres. Exemplary thicknesses for the bead bonding layer include: thicknesses of at least 10, 25, 50, 100, or even 250 µm (micrometers) or even more (e.g., at least 1 millimeter, at least 1 centimeter, or even 1 meter).

Microsphere Layer

The microsphere layer comprises a plurality of microspheres. The microspheres useful in the present disclosure comprise glass, ceramics, and combinations thereof such as glass-ceramics. Glass is an amorphous material, while ceramic refers to a crystalline or partially crystalline material. Glass ceramics have an amorphous phase and one or more crystalline phases. These materials are known in the art.

In some embodiments, the microspheres are glass beads. The glass beads are largely spherically shaped. The glass beads are typically made by first grinding ordinary soda-lime glass or borosilicate glass, typically from recycled sources such as from recycled sources such as from plate or container glass and/or glass tubing, and then heat treating/firing the particles. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation "NEXTERION GLASS D" from Schott Industries, Kansas City, Mo., and glass available under the trade designation "PYREX" from Corning Incorporated, New York, N.Y.

The grinding process yields a wide distribution of glass particle sizes. The glass particles are spherodized by treating in a heated column to melt the glass into spherical droplets, which are subsequently cooled. Not all the particles are perfect spheres. Some are oblate, some are melted together and some contain small bubbles.

In one embodiment, the microspheres comprise a surface modification as is known in the art to improve the adhesion to the bead bonding layer. Such treatments include those selected from the group consisting of silane coupling agent, titanate, organo-chromium complex, and the like, to maximize the adhesion of the microspheres to the first polymer layer. Preferably, the coupling agent is a silane such as aminosilane, glyoxide silane, or acrylsilane.

In one embodiment, the treatment level for such coupling agents is on the order of 50 to 700 parts by weight coupling agent per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the coupling agent with the microsphere, followed by drying in a tumbler or auger-fed dryer to prevent the microspheres from sticking together. One skilled in the art would be able to determine how to best treat the microspheres with the coupling agent.

In one embodiment, the microspheres of the present disclosure have a Knoop hardness of at least 1,300 kg/mm$^2$, or even 1,800 kg/mm$^2$. The "Knoop hardness" as used herein is an indentation of microhardness measured by using a Knoop indenter; it is a value obtained by dividing the applied load with which a rhombic indentation is formed on the surface of a sample, by the projected area of the indentation computed from the long diagonal of the permanent indentation. The method for measuring the Knoop hardness is described in ASTM C849-88 (2011) "Standard Test Method for Knoop Indentation Hardness of Ceramic Whitewares".

The microspheres for use in the present invention are substantially spherical, for example, having a sphericity of at least 80%, 85%, or even 90%, where sphericity is defined as the surface area of a sphere (with the same volume as the given particle) divided by the surface area of the particle, reported as a percentage.

Preferable examples of the spherical particles include fused alumina, alumina produced by the Bayer process, zirconia, and eutectic mixtures thereof.

As a method for shaping inorganic particles into spherical ones, it is possible to apply a method in which the above-described inorganic material in an indeterminate form is ground, and melted in a high-temperature oven at a temperature above the melting point thereof, thereby obtaining spherical particles by utilizing the surface tension; or a method in which the above-described inorganic material is melted at a high temperature above the melting point thereof, and the melt is sprayed to obtain spherical particles.

The microspheres useful in the present disclosure may be transparent, translucent, or opaque.

In another embodiment, the microspheres have a refractive index of less than 1.30, 1.40, 1.49, 1.50, 1.53, 1.55, 1.57, or even 1.60. The refractive index may be determined by the standard Becke line method.

The microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers.

In some embodiments, a useful range of average microsphere diameters is at least 10, 20, 25, 40, 50, 75, 100, or even 150 μm (micrometers); at most 200, 400, 500, 600, 800, 900, or even 1000 μm. The microspheres may have a unimodal or multi-modal (e.g., a bimodal) size distribution depending on the application.

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening.

Alternately, average diameter can be determined using any commonly known microscopic methods for sizing particles. For example, optical microscopy or scanning electron microscopy, and the like, can be used in combination with any image analysis software. For example, software commercially available as free ware under the trade designation "IMAGE J" from NIH, Bethesda, Md.

In one embodiment, the plurality of microspheres have a difference in size distribution not more than 70%, 50%, 40%, 30% or even 20% based on the average microsphere diameter.

As will be discussed below, the bead films comprising a plurality of microspheres, wherein the microspheres are partially embedded in the bead bonding layer can be made by a number of different processes. Depending on how the bead film was prepared, the bead films may comprise a monolayer of microspheres, or one side of the bead bonding layer may comprise more than a monolayer of microspheres, wherein at least some of the plurality of microspheres are partially embedded in the bead bonding layer, while a portion of the plurality of microspheres may be completely embedded in the bead bonding layer. Additionally, depending on how the bead film was made, the partially embedded microspheres may be uniformly embedded or not uniformly embedded within the bead bonding layer. Preferably, the plurality of microspheres embedded in the bead bonding layer are sufficiently embedded such that they are not displaced during the subsequent truncating. For a given plurality of microspheres that are uniformly partially embedded in a bead bonding layer, in one embodiment, approximately at least 50%, 60%, 65%, 70%, or even 75% and no more than 85% or even 80% of the microsphere diameter (prior to truncation) is embedded into the bead bonding layer. In another embodiment, wherein the plurality of microspheres are not uniformly partially embedded in a bead bonding layer, the microspheres may be embedded at less than 50%, 25% or even 10% and more than 85% or even 90% of the microsphere diameter prior to truncation.

The constructions of the present disclosure comprise a plurality of microspheres, which, in one embodiment are arranged in a monolayer (i.e., a single layer) on the surface of the bead bonding layer. Typically, the plurality of microspheres are randomly-distributed and closely packed (i.e., generally there is not enough space between neighboring microspheres to place another microsphere). Alternatively, the microsphere layer may comprise more than a monolayer of microspheres.

In the constructions of the present disclosure, the microsphere layer comprises a plurality of truncated microspheres, wherein the exposed surface of the microsphere (i.e., the surface of the microsphere not embedded in the bead bonding layer) is truncated.

As used herein, the term "first surface" is used to refer to the outermost surface of the microsphere layer, comprising the surface of the microspheres not embedded in the bead bonding layer. In one embodiment, substantially the entire plurality of microspheres along the first surface of the construction is truncated. For example, more then 90, 95, 98, 99, or even 100% of the plurality of microspheres along the first surface are truncated. In another embodiment, the truncating is localized, wherein just a portion of microspheres along the first surface of the construction are truncated. For example, at least 1, 3, 5, 10, or even 15% and no more than 40, 50, 75, or even 85% of the plurality of microspheres on the first surface are truncated.

In one embodiment, the microspheres are planarized, meaning that the truncated portion of the microsphere was removed along a plane that dissected the microsphere. Generally the truncation of the microspheres is substantially planar across the microsphere layer, meaning that there is less than 20, 15, 10 or even 5 degree angle of difference across the plane. Although not ideal, such lack of true-planarity can arise due to edge effects, rounding, etc. that can occur during the planing (truncating) process.

In one embodiment, the microspheres are truncated, wherein the microspheres are dissected by a latitudinal plane that is substantially parallel to the bead bonding layer, in other words, less than 20, 15, 10 or even 5 degree angle of difference between the plane formed by the truncated surface of the plurality of microspheres and the major surface of the bead bonding layer, which is opposite the surface embedded with microspheres.

In one embodiment, the construction of the present disclosure is durable, meaning that it has abrasion and/or scratch resistance. Abrasion resistance, can be measured using a rotary Taber abrader and visually inspecting the samples for damage. The scratch resistance can be measured by pencil hardness. In other words, at which hardness the pencil scratches the surface. In one embodiment, the constructions of the present disclosure have a pencil hardness value of at least 6H, 8H, or even 10H at a force of 2.5 Newtons. In one embodiment, the constructions of the present disclosure have a pencil hardness value of at least 3H, 5H, 6H, 8H, 9H, or even 10H at a force of 7.5 Newtons.

In one embodiment, the constructions of the present disclosure permit better visibility of an object (e.g., an image) located on the backside of the construction, i.e., behind the microsphere layer and the bead bonding layer.

In one embodiment, the constructions of the present disclosure have improved optical quality as compared to an identical construction not comprising truncated microspheres. These optical qualities can be quantitated in terms of transmission, haze, and clarity. Transmission is the amount of visible light that passes through the sample and reaches the detector. Light that is absorbed, scattered or reflected is not transmitted. Scattering can occur due to rough surfaces or refractive index mismatches between the microspheres and the bead bonding layer, inclusions of air or debris, etc. In one embodiment, the constructions of the present disclosure transmit at least 75, 80, 85, 90, or even 95% of the incident light. Of the light transmitted through the sample, haze refers to the percentage of light that deviates more than 2.5 degrees from the incident beam. Haze is a measure of the wide angle scattering and results in a reduction in contrast. In one embodiment, the constructions of the present disclosure have a haze of less than 85, 75, 50, 25, 15, or even 10%. Clarity refers to transmitted light that deviates less than 2.5 degrees from the incident beam. Clarity is a measure of narrow angle scattering and relates to the resolution of detail of objects viewed through a sample. Clarity is a distance-dependent attribute, for example, decreasing as the distance between sample and object increases. In one embodiment, the sample is placed next to an illumination source and a sensor (comprising a center sensor and a ring sensor is placed at a given distance from the illumination source. Clarity can be defined as $$100\% \cdot \frac{I_C - I_R}{I_C + I_R}$$

where $I_C$ is the intensity at the center sensor and $I_R$ is light intensity at the ring sensor. No clarity (or 0%) would be equal intensity at the center and ring sensor, and 100% clarity would be zero intensity at the ring sensor (i.e. no light diverted less than 2.5 degrees from the incident light beam). In one embodiment, the constructions of the present disclosure have a clarity of greater than 40, 50, 60, 70, 80, or even 90% using the method disclosed in the example section.

In one embodiment, the constructions of the present disclosure have improved clarity over a non-truncated construction. To further improve clarity, the refractive index of the plurality of microspheres can be matched to the refractive index of the bead bond layer, wherein the smaller the difference, the better the clarity. In one embodiment, the difference between the refractive index of the microspheres and the bead bonding layer is less than 0.3, 0.1, 0.03, 0.01, or even 0.003.

In one embodiment, the constructions of the present disclosure do not show finger prints. In one embodiment, the constructions of the present disclosure have a glossy (non-matte) finish.

Method of Making

In one embodiment, a bead film, comprising a plurality of microspheres, such as disclosed in the prior art, can be surface treated such that the tops of a plurality of microspheres are removed.

In one embodiment, the bead films are made via a transfer method, wherein the plurality of microspheres is temporarily embedded into the transfer polymer layer of a transfer article and the bead bonding layer is constructed upon the partially embedded microspheres optionally along with the substrate layer. The plurality of microspheres now embedded in the bead bonding layer is separated from the transfer polymer layer generating a bead film. Such transfer techniques are known in the art. See, for example U.S. Pat. Publ. No. 2015-0343502 (Clark et al.).

In another embodiment, the bead film is provided by contacting a plurality of microspheres directly onto a bead bonding layer. The plurality of microspheres may be applied directly onto the bead bonding layer for example by cascade coating. To facilitate embedding of the microspheres, the bead bonding layer should be accepting of the microspheres, in other words, the bead bonding layer should be of a state such that the microspheres adhere and/or can be easily embedded into the bead bonding layer. For example, the bead bonding material can be in a liquid, molten, uncured, solvent-swollen, and/or tacky state. In one embodiment, either through forces such as wicking or pressure, the plurality of microspheres during or after contact with the bead bonding layer can be partially embedded into the bead bonding layer. See, for example U.S. Pat. No. 2,407,680 (Cross et al.), which describes drop coating beads onto a wet coating.

In one embodiment, the plurality of microspheres is dispersed in a liquid or molten resin, which is then coated or extruded. Upon curing, the resin solidifies resulting in a plurality of microspheres at the surface of a bead bonding layer. See, for example U.S. Pat. Publ. No. 2009-0246439 (Kanno).

Traditionally, the non-transfer process techniques are not desirable for a textured surface having a smooth-to-touch or low coefficient of friction, due to the gross height differences between microspheres.

In the present disclosure, the first surface of the construction is treated such that the tops of a plurality of microspheres are removed (i.e., truncated). Such removal may be conducted through the use of abrasive articles which contact the first surface of the bead film.

Abrasive articles to abrade a surface are known in the art. In one embodiment, abrasive particles are adhered to a backing to form an abrasive article, which can be provided as a belt, disc or sheet. In another embodiment, abrasive particles are provided in a slurry. In another embodiment, abrasive particles are provided in a vitrified or resinous bonded pellet or wheel. Examples of abrasive particles include aluminum oxide, silicon carbide, alumina zirconia, iron oxide, diamond, ceria, cubic boron nitride, garnet and combinations thereof. In one embodiment, the abrasive article utilize diamond abrasive particles. These diamond abrasive particles can be natural or synthetically made diamonds. Relative to synthetically made diamonds, the particles may be considered "resin bond diamonds", "saw blade grade diamonds" or "metal bond diamonds". The diamonds may have a blocky shape associated with them or alternatively, a needle like shape. The diamond particles may contain a surface coating such as a metal coating (e.g., nickel, aluminum, copper or the like), an inorganic coating (e.g., silica) or an organic coating. The abrasive article may contain a blend of diamond with other abrasive particles.

In one embodiment, one abrasive article having a given average abrasive particle size is used to abrade the surface. More preferably, more than one abrading step is used in truncating the plurality of microspheres of the present disclosure, wherein a sequence of abrasive articles is employed during which the average scratch depth is continuously reduced. The first abrasive article employed will typically contain abrasive particles that have a larger particle size. As the abrading continues, the abrasive particle size in the abrasive article employed is generally reduced by the user by changing the abrasive article. This results in a gradual reduction in scratch depth. The number of abrasive articles, time for abrading, types of abrasive particles and sizes of abrasive particles will depend upon various factors such as the microsphere material, the size of the microspheres and the amount of material to be abraded.

For example, the abrasion of the surface can involve grinding, finishing, and/or polishing.

The grinding step is used to rapidly remove material and any defects by rough grinding the first surface with an abrasive tool. Typically this abrasive tool contains a super-hard abrasive particle such as a diamond, tungsten carbide or cubic boron nitride. The resulting microspheres will be truncated, typically down to the desired level. However, the abrasive tool in this rough grinding process will impart coarse scratches into the microspheres' surface such that resulting surface is neither precise enough nor smooth enough to directly polish to an optically clear state. Typically, this step involves coarser abrasive particles, which provide a rougher finish. For example, 6 to 10 micrometers sized diamond particles for abrading glass and 20 to 45 micrometer diamond sized particles for abrading ceramics.

The second step is called "finishing." The purpose of the finishing step is to refine the coarse scratches generated by the rough grinding process. In general, the finishing process will remove the deep scratches from rough grinding and provide a substantially smooth, although not polished surface. The finishing process should also result in sufficient removal of the coarse scratches such that the surface can be polished to an optically clear surface. If the finishing process does not remove all the coarse scratches, then it can be extremely difficult for the polishing step to remove these scratches to obtain an optically clear surface. Typically, this step involves smaller-sized abrasive particles, which make the surface smoother. For example 0.5 to 3 micrometers diamond sized particles for abrading glass and 6 to 10 micrometer sized diamond particles for abrading ceramics.

The polishing step is typically done with a loose abrasive slurry. The loose abrasive slurry comprises a plurality of abrasive particles dispersed in a liquid medium such as water. The most common abrasive particles used for loose slurries are cerium oxide, fumed silica, and the like. The loose abrasive slurry may optionally contain other additives such as dispersants, lubricants, defoamers and the like. In most instances, the loose abrasive slurry is pumped between the first surface of the construction and a pad, such that the loose abrasive slurry is present between the first surface of the construction and the pad. Typically this step involves sub-micron sized abrasive particles, which can make a very smooth finish.

The roughness of a surface is typically due to scratches or a scratch pattern, which may or may not be visible to the naked eye. A scratch pattern can be defined as a series of peaks and valleys along the surface. Rtm and Ra are common measures of roughness used in the abrasives industry, however, the exact measuring procedure can vary with the type of equipment utilized in surface roughness evaluation. As used herein, Rtm and Ra measurements are based on procedures followed with the Rank Taylor Hobson (Leicester, England) profilometer, available under the trade designation SURTRONIC 3.

Ra is defined as an average roughness height value of an arithmetic average of the departures of the surface roughness profile from a mean line on the surface. Measurements are taken at points both above and below the mean line on the surface within an assessment length set by the Rank Taylor Hobson instrument. Ra and Rtm (defined below) are measured with a profilometer probe, which is a 5 micrometer radius diamond tipped stylus used for the coarse finishes and a 0.25 micrometer radius used for the polished surfaces and the results are recorded in micrometers (μm). These departure measurements are totaled and then divided by the number of measurements to arrive at an average value. Generally, the lower the Ra value, the smoother the finish.

Rt is defined as the maximum peak-to-valley height. Rtm is the average, measured over five consecutive assessment lengths, of the maximum peak-to-valley height in each assessment length. In general, the lower the Rtm value, the smoother the finish. A slight variation in the Ra and Rtm values can, but not necessarily, occur when the measurement on the same finished glass surface is performed on different brands of commercially available profilometers.

During the abrading, typically, a coarser abrasive particle is used, followed by finer abrasive particles. In one embodiment, all of the steps recited above are used to truncate a plurality of microspheres. In another embodiment, the grinding and finishing steps are used. In another embodiment, the finishing and polishing steps are used.

An "optically clear surface" refers to a surface that is essentially free of any defects, imperfections and/or minute scratches visible to the naked eye. An optically clear surface (typically having an Ra less than 20 nm) in the present construction can be achieved with the finishing or polishing steps.

It is preferred to abrade the construction in the presence of a liquid. The liquid has several advantages associated with it. It inhibits heat build-up during abrading and removes the swarf away from the interface between the abrasive article and the beadfilm. "Swarf" is the term used to describe the actual glass and/or ceramic debris that is abraded away by the abrasive article. In some instances, the glass swarf can damage the surface being abraded. Thus it is desirable to remove the swarf from the interface. Abrading in the presence of a liquid also results in a finer finish on the construction's surface. This liquid can be water, an organic lubricant, a detergent (e.g., anionic or nonionic surfactant in solution), a coolant or combinations thereof. The liquid may further contain additives to enhance abrading. These liquids are known in the art. A commercially available liquid include a coolant under the trade designation "LAPFASTER SO" available from Process Research Products, Trenton, N.J.

The removal rate (or truncation rate) of the plurality of microspheres depends on the microsphere composition, the abrasive particle type, the speed at which the abrasive article is moved relative to the construction's first surface, and the force of the abrasive article onto the construction's first surface. During abrading, the abrasive article moves relative to the construction's first surface and is forced, typically downward, onto the construction's surface. Preferably the force ranges from about 35 g/cm$^2$ to about 400 g/cm$^2$. If the downward force is too high, then the abrasive article may not refine the scratch depth and in some instances may increase the scratch depth. Also, the abrasive article may wear excessively if the down force is too high. Conversely, if the downward force is too low, the abrasive article may not effectively refine the scratch depth and generate an optically clear surface.

The construction's first surface or the abrasive article or both will move relative to the other during the abrading step. This movement can be a rotary motion, a random motion, or linear motion. Rotary motion can be generated by attaching an abrasive disc to a rotary tool. The first surface and abrasive article may rotate in the same direction or opposite directions, but if in the same direction, at different rotational speeds. For machines, operating revolutions per minute (rpm) may range up to about 4000 rpm, preferably from about 25 rpm to about 2000 rpm, and more preferably from about 30 rpm to about 1000 rpm, depending on the abrasive article employed.

In many instances, the abrasive article is bonded to a support pad. The support pad is typically a compressible material that provides support for the abrasive article. Likewise the support pad will be made from a conformable material such that when the abrasive article is attached to the support pad, the resulting abrading article can conform to the microsphere layer of the construction as necessary, especially for constructions that are contoured or have a shape associated with them. The support pad can be made from a polyurethane foam, rubber material, an elastomer, a rubber based foam, a combination of these materials, or any other suitable material. The hardness and/or compressibility of the support pad material is selected to provide the desired polishing characteristics (cut rate, flatness of the finished surface, abrasive article product life and glass workpiece surface finish).

Exemplary types of commercially abrasive articles include those available under the trade designation "3M TRIZACT DIAMOND TILE 677XA", "3M TRIZACT DIAMOND POLISHING CLOTH BELT 652WY", "3M TRIZACT DIAMOND 673FA", "3M TRIZACT DIAMOND 673LA", "3M TRIZACT CLOTH BELT 307EA", "3M TRIZACT CLOTH BELT 317EA", "3M MARINE IMPERIAL COMPOUND AND FINISHING MATERIAL", all available from 3M Co. St. Paul, Minn.

In one embodiment, the abrasive article is a lapping film. In general, a lapping coated abrasive comprises a backing having an abrasive coating bonded to it. This abrasive coating comprises a plurality of abrasive particles dispersed in a binder. For example, U.S. Pat. No. 4,255,164 (Butzke et al.), U.S. Pat. No. 4,576,612 (Shukla et al.), U.S. Pat. No. 4,733,502 (Braun) and European Patent Application No. 650,803 disclose various abrasive articles and polishing processes. Other references that teach lapping coated abrasive articles include U.S. Pat. No. 4,644,703 (Kaczmarek et al.), U.S. Pat. No. 4,773,920 (Chasman et al.) and U.S. Pat. No. 5,014,468 (Ravipati et al.). Commercially available lapping films include those available under the trade designations "3M LAPPING FILM ALUMINUM OXIDE" series and "IMPERIAL 3M DIAMOND LAPPING FILM" series available from 3M Co., St. Paul, Minn.

In some instances loose abrasive slurries prove more effective than fixed abrasives in terms of finish, cost, and/or removal rate. "3M TRIZACT COMPOSITE SLURRY" available from 3M Co., St. Paul, Minn., is particularly effective at finishing ceramic materials.

In one embodiment, the abrasive article is a three dimensional abrasive coated substrate. Such abrasive articles are disclosed, for example, in U.S. Pat. No. 5,888,119 (Christianson et al.).

In the present disclosure, the first surface of the construction is abraded resulting in truncated microspheres. After truncating the microsphere layer, the construction can be washed to remove any debris, for example using high pressure water.

Generally, the constructions are abraded such that the first surface comprises truncated microspheres, which are relatively smooth and free of visible scratches (e.g., an optically clear surface). In one embodiment, the microspheres have a Ra of less than 20 nm, or even less than 10 nm.

When discussing the truncated microspheres along the construction's first surface, the microsphere height, h, can be used to describe the vertical distance from the bead bond layer to the planar top of the microsphere. In one embodiment, the bead film comprising a plurality of microspheres, which are partially embedded in a bead bonding layer is abraded such that there is no height difference between the bead bonding layer to the planar top of the microsphere. In some embodiments, there is a height difference between the bead bonding layer and the planar top of the truncated microspheres. As discussed above, the plurality of microspheres embedded in the bead bonding layer will vary based on how the bead film was made. For example, if the bead film was made by a transfer method, the bead film may comprise a monolayer of microspheres which are uniformly embedded in the bead bonding layer. In this instance, truncating of the microsphere layer can result in an average h value of at least 0.1, 1, or even 5 μm to at most 8, 10, or even 15 μm. If the bead film was made by contracting or pressing beads into an accepting bead bonding layer, the bead film may comprise microspheres which are not uniformly embedded in the bead bonding layer, wherein some are embedded more than others. If the bead film was made using a dispersion of microspheres in a resin, the bead film may comprise microspheres which are not uniformly embedded in the bead bonding layer, wherein some are embedded more than others. In these last two instances, truncating of the microsphere layer can result in some exposed microspheres being truncated to a given h and some exposed microspheres not being truncated at all because their apex was below the h value.

Additional Layers

In addition to the substrate, bead bonding layer, and microsphere layer previously mentioned, the resulting construction of the present disclosure may also comprise additional layers to impart desirable characteristics into the construction.

In one embodiment, a nanoparticle-containing undercoat may be applied between the microsphere layer and the bead bonding layer to provide anti-soiling properties as taught in U.S. Pat. Publ. No. 2015-0343502 (Clark et al.), incorporated herein by reference.

In one embodiment, a reinforcing layer is disposed on the surface of the bead bonding layer, opposite the embedded microsphere layer. The reinforcing layer can be used to provide advantageous handling characteristics, and in doing so, permit the use of a thinner bead bonding layer. Examples of suitable reinforcing layers include polyurethanes resin systems, acrylic resin, polyester resins, and epoxy resins. Suitable polyurethane resin systems include, but are not limited to, those selected from at least one of: polyurethane dispersions, 2-part urethanes coated from solvent, and 100% solids 2-part urethanes. Suitable acrylic resin systems include, but are not limited to, those selected from UV-curable acrylic resin systems and thermally curable acrylic resin systems. Such systems may be solvent coated, aqueous dispersions, or hot melt coated. One suitable type of polyester resin is co-amorphous polyester resins. Suitable epoxy resin systems include, but are not limited to, those selected from at least one of two part and one part epoxy resins.

In one embodiment, the construction is thermoformable or stretchable. Thus, it may be advantageous to include layers that can bear the elongation that occurs during forming or stretching without failing, cracking, or generating other defects. This can be achieved by using materials that have a temperature at which they undergo melt flow and forming near that temperature. In some cases, crosslinked materials that do not flow can be used, but they are more likely to crack during the elongation. To avoid this cracking, in one embodiment, the crosslink density should be kept low, as can be indicated by a low storage modulus in the rubbery plateau region. In addition, it is preferred to do the forming at relatively low temperatures, since as temperatures increase above the glass transition temperature of crosslinked materials, their capacity for elongation begins to decrease. In some embodiments, the construction includes an additional layer which has good capacity for elongation and prevents elastic recovery of the bead bonding and/or substrate layer. In one embodiment, this additional layer, disposed between the bead bonding layer and the substrate is a material having a glass transition temperature greater than or equal to 60° C. and less than or equal to 150° C., such a material includes an amorphous polyester such as a non-crystalline PET (e.g., amorphous PET, PETG, or polycarbonate).

In one embodiment, the bead bonding layer can optionally perform the function of acting as the adhesive for a desired substrate and/or further comprise pigment(s) such that it also has a graphic function.

The bead bonding layer, when selected to function also as a substrate adhesive graphic image, may be, for example, pigmented and provided in the form of an image, such as, for example, by screen printing the bead bonding layer in the form of a graphic for transfer to a separate substrate. However, the bead bonding layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the bead bonding layer opposite the microsphere layer by at least one colored polymeric layer. The optional colored polymeric layer may, for example, comprise an ink. Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

In one embodiment, the construction of the present disclosure is substantially free of a coating. In other words, there is no additionally layer on the truncated portion of the microsphere layer.

In one embodiment, the constructions of the present disclosure are flexible, meaning that they can bend and conform to curved objects without cracking, breaking, etc.

Compared to constructions comprising a microsphere layer that has not been truncated, the constructions of the present disclosure have, in one embodiment, similar durability but improved clarity and/or reduced haze.

Exemplary embodiments of the present disclosure include, but are not limited to the following:

Embodiment 1

A construction comprising:
a microsphere layer comprising a plurality of microspheres, wherein the microspheres comprise glass, ceramic, and combinations thereof;
a bead bonding layer, wherein the plurality of microspheres is partially embedded in the bead bonding layer forming a first surface comprising exposed microspheres, wherein the plurality of microspheres on the first surface are truncated.

Embodiment 2

The construction of embodiment 1, wherein the plurality of microspheres are substantially planarized across the first surface.

Embodiment 3

The construction of embodiment 2, wherein the plurality of microspheres are truncated by latitudinal plane parallel to the bead bonding layer.

Embodiment 4

The construction of any one of the previous embodiments, wherein the refractive index of the bead bonding layer and the refractive index of the microspheres has a difference of less than 0.05.

Embodiment 5

The construction of any one of the previous embodiments, wherein the bead bonding layer is selected from at least one of: a polyurethane, polyesters, (meth)acrylic acid ester polymers, an epoxy, a (meth)acrylate, polyvinylchloride polymer, polyvinyl acetate polymer, polyamides, a urethane/(meth)acrylate, a silicone, polyolefin, acrylobutadiene polymers, fluoropolymers, and blends thereof.

Embodiment 6

The construction of any one of the previous embodiments, wherein the microsphere layer comprises a monolayer of microspheres.

Embodiment 7

The construction of any one of the previous embodiments, wherein the microspheres in the plurality of microspheres have an average diameter of 10 to 1000 micrometers.

Embodiment 8

The construction of any one of the previous embodiments, wherein the microspheres in the plurality of microspheres have a sphericity of at least 80%.

Embodiment 9

The construction of any one of the previous embodiments, wherein the microspheres in the plurality of microspheres have a size difference of no more than 50%.

Embodiment 10

The construction of any one of the previous embodiments, wherein the plurality of microspheres are embedded no more than 80% of their average diameter in the bead bonding layer.

Embodiment 11

The construction of any one of the previous embodiments, wherein the first surface is substantially free of a coating.

Embodiment 12

The construction of any one of the previous embodiments, further comprising a substrate, wherein the bead bonding layer is disposed between the substrate and the microsphere layer.

Embodiment 13

The construction of any one of the previous embodiments, wherein only a portion of the plurality of microspheres on the first surface are truncated.

Embodiment 14

An article comprising the construction of any one of the previous embodiments.

Embodiment 15

A method of making a construction comprising:
(i) obtaining a bead film comprising a microsphere layer comprising a plurality of microspheres, wherein the microspheres comprise glass, ceramic, and combinations thereof; and a bead bonding layer, wherein the plurality of microspheres is partially embedded in the bead bonding layer forming a first surface comprising exposed microspheres; and
(ii) abrading the first surface to truncate the plurality of microspheres on the first surface.

Embodiment 16

The method of embodiment 15, wherein abrading is performed with an abrasive particle selected from diamond, silicon carbide, and cubic boron nitride.

Embodiment 17

The method of any one of embodiments 15-16, wherein a lubricant is used during the abrading step.

Embodiment 18

The method of any one of embodiments 15-17, wherein the first surface is contacted with diamond lapping film.

Embodiment 19

The method of any one of embodiments 15-18, wherein the first surface is contacted with a 3D abrasive construction.

Embodiment 20

The method of any one of embodiments 15-19, wherein the abrading step comprises a plurality of abrading steps with an increasing degree of polish.

Embodiment 21

The method of any one of embodiments 15-20, wherein the beadfilm is made by the following process: (a) embedding a layer of microspheres in a transfer polymer; (b) contacting the embedded layer of microspheres with a bead bonding layer; and (c) removing the transfer polymer to form the beadfilm.

Embodiment 22

The method of embodiment 21, wherein the second polymer is selected from at least one of a polyolefin, organic wax, and combinations thereof.

Embodiment 23

The method of any one of embodiments 15-20, wherein the beadfilm is made by contacting a plurality of microspheres onto an accepting bead bonding layer to partially embed the plurality of microspheres to form the beadfilm.

Embodiment 24

The method of embodiment 23, wherein the plurality of microspheres is pressed into the accepting bead bonding layer.

Embodiment 25

The method of any one of embodiments 15-20, wherein the beadfilm is made by a dispersion comprising a plurality of microspheres and a liquid bead bonding resin.

Embodiment 26

The method of any one of embodiments 15-25, wherein the bead bonding layer is selected from at least one of: a polyurethane, polyesters, phenolics, (meth)acrylic acid ester polymers, an epoxy, a (meth)acrylate, polyvinylchloride polymer, polyvinyl acetate polymer, polyamides, a urethane/(meth)acrylate, a silicone, a polyolefin, a fluoropolymer, acrylobutadiene polymers, and blends thereof.

Embodiment 27

The method of any one of embodiments 15-26, wherein the bead bonding layer is selected from at least one of (i) a resin comprising a fluorine-containing polymer, (ii) a linear resin, (iii) a resin having low crosslink densities, (iv) a resin having high crosslink densities, and (v) combinations and blends thereof.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

The following abbreviations are used, mJ=milliJoule; cm=centimeter; N=Newtons; MPa=MegaPascals;
Materials

| | |
|---|---|
| PC | A clear polycarbonate film having a thickness of 0.005 inches (127 micrometers) and a glass transition temperature of 153° C., available under the trade designation "LEXAN 8010" from SABIC Innovative Plastics, Pittsfield, MA. Unless otherwise stated, the film was corona treated before use at 500 mJ/cm². |
| XP2617 | A largely linear NCO (isocyanate) prepolymer based on hexamethylene diisocyanate with a NCO content of 12-13% available under the trade designation "DESMODUR XP 2617" from Covestro, LLC, Pittsburgh, PA. |
| MEK | Methyl ethyl ketone, having no more than 0.05 wt % of water. |
| 1,4 BUTANEDIOL | A liquid diol having a molecular weight of 90 grams/mole and a boiling point of 235° C., available as 1,4-butanediol from Chemtura Corporation, Middlebury, CT. |

| | |
|---|---|
| T12 | Dibutyltin dilaurate (DBTDL), a liquid catalyst, available under the trade designation DABCO T-12 from Air Products and Chemicals, Incorporated, Allentown, PA. |
| A1100 | gamma-Aminopropyltrimethoxysilane, a clear liquid coupling agent available under the trade designation SILQUEST A1100 from Momentive Performance Materials Incorporated, Columbus, OH. |
| TINUVIN 405 | A solid, triazine-based UV absorber available under the trade designation TINUVIN 405 from BASF SE, Wyandotte, MI. |
| Borosilicate glass powder | A milled borosilicate glass powder having a size distribution of less than 200 mesh and density of 2.23 g/cc, refractive index of 1.47 using the Becke line method, can be available as "PYREX 7740" from Strategic Materials Incorporated, Houston TX. |

Methods

Method for Optical Measurements

Total transmittance, haze, and clarity measurements were made using a BYK Haze-Gard Plus, Model No. 4725 (BYK-Gardner USA, Columbia, Md.), an integrating sphere instrument having 0°/diffuse geometry and CIE standard illuminant C. Film orientation was such that incident light beam from the instrument interacted with the microsphere surface of the film first. Samples were placed directly at the haze port for measurement of transmittance and haze and at the clarity port for measurement of clarity.

Method for Determining Pencil Hardness

Free-standing microsphere films were evaluated for pencil hardness following a similar procedure as described in ASTM D 3363-05(2001) e2. Abrasive sandpaper (Grit No. 400) was adhered to a flat and smooth benchtop with double coated tape. Pencil leads (Turquoise Premium pencil leads (9 H to 6 B in hardness) from Prismacolor Professional Art Supplies, a subsidiary of Newell Rubbermaid Office Products, Oak Brook, Ill.) Totiens Drawing Leads with mechanical lead holder) were held at an angle of 90° to the abrasive paper and abraded until a flat, smooth, circular cross-section was achieved, free of chips or nicks on the edge of the lead. The force on the tip of the pencil was fixed at 7.5 N. The free-standing bead film was placed on a glass surface. Using a freshly prepared pencil lead for each test, the lead was pressed firmly against the film at a 45° angle and at the desired load using an Elcometer 3086 Motorised Pencil Hardness Tester (obtained from Elcometer Incorporated, Rochester Hills, Mich.) and drawn across the test panel in the "forward" direction for a distance of at least 0.635 cm (0.25 inch). Three pencil tracks were made for each grade of lead hardness. Prior to inspection, crumbled lead was removed from the test area using a damp paper towel wetted with isopropyl alcohol. The film was inspected by eye for defects and under an optical microscope (50×-1000× magnification) for the first 0.317 cm to 0.635 cm (0.125 inch to 0.25 inch) of each pencil track. Moving from harder leads to softer, the process was repeated down the hardness scale until a pencil was found that did not scratch the film or rupture it, or dislodge or partially dislodge any beads. At least two of three tracks at each lead hardness were required to meet these criteria in order to pass. The hardest level of lead that passed was reported as the pencil hardness of the film. If the sample passed a pencil hardness and no additional pencils (i.e, no harder pencils) were used, the value was reported with a ">" in front of the pencil hardness. Values of 3H at a force of 7.5 Newtons, or harder, are desirable.

Method for Preparing Borosilicate Bead Carrier

Borosilicate glass powder was passed through a flame treater twice by passing them through a hydrogen/oxygen flame at a rate of 3 grams/minute to form microspheres and were collected in a stainless steel container whereupon metallic impurities were removed using a magnet. The resulting glass microspheres were treated with 600 ppm of A1100 in the following manner. The silane was dissolved in water, then added to the microsphere beads with mixing, air dried overnight, followed by drying at 110° C. for 20 minutes. The dried, silane treated microsphere beads were then sieved to remove any agglomerates and provide beads having a size of 75 micrometers or less and were free flowing. The resulting transparent silane treated microspheres were cascade coated using a mechanical sifter onto a transfer carrier comprising a polyethylene coated polyester substrate liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Method for Preparing Films

A polyol solution was prepared by adding 2323.86 grams 1,4-Butanediol, 100.32 grams TINUVIN 405, 10.03 grams T12 and 4170.50 grams MEK to a 5 gallon (18.9 liter) pail and mixing with an air-powered propeller stirrer. An isocyanate solution was prepared by adding 13628.75 grams XP2617 and 1514.31 grams MEK to a 5 gallon (18.9 liter) pail and then mixing with an air-powered propeller stirrer.

The polyol solution and the isocyanate solution were fed into a static mixer to provide an output dried coating weight of 69.3 grams per square meter onto PC at a width of 43 centimeters (17 inches) using a knife coater having a gap setting of about 127 micrometers (0.005 inches) greater than the thickness of the PC. The coating was carried out at a speed of 7.62 meters/minute (25 feet/minute) and dried and cured in line with five ovens set at 66° C. (150° F.), 66° C. (150° F.), 71° C. (160° F.), 82° C. (180° F.), and 96° C. (205° F.), respectively that was then processed through a lamination step where beaded film transfer article (i.e., borosilicate bead carrier) was adhered to the coated urethane via a pressure nip with a heated roll 102° C. (215° F.) and applying a pressure of 0.55 MPa. The approximate ratio of equivalents isocyanate to equivalents hydroxyl was 1.05:1.0. The total thickness of the coated beaded film transfer article was measured and found to be approximately 225 micrometers (0.225 millimeters). A bead film of two part polyurethane resin with partially embedded borosilicate microsphere beads on one side and polycarbonate film on the other side was obtained by removal of the transfer carrier.

Comparative Example 1 (CE-1)

CE-1 sample was prepared as described above in "Method for Preparing Films".

Example 1 (EX-1)

Figure 3:
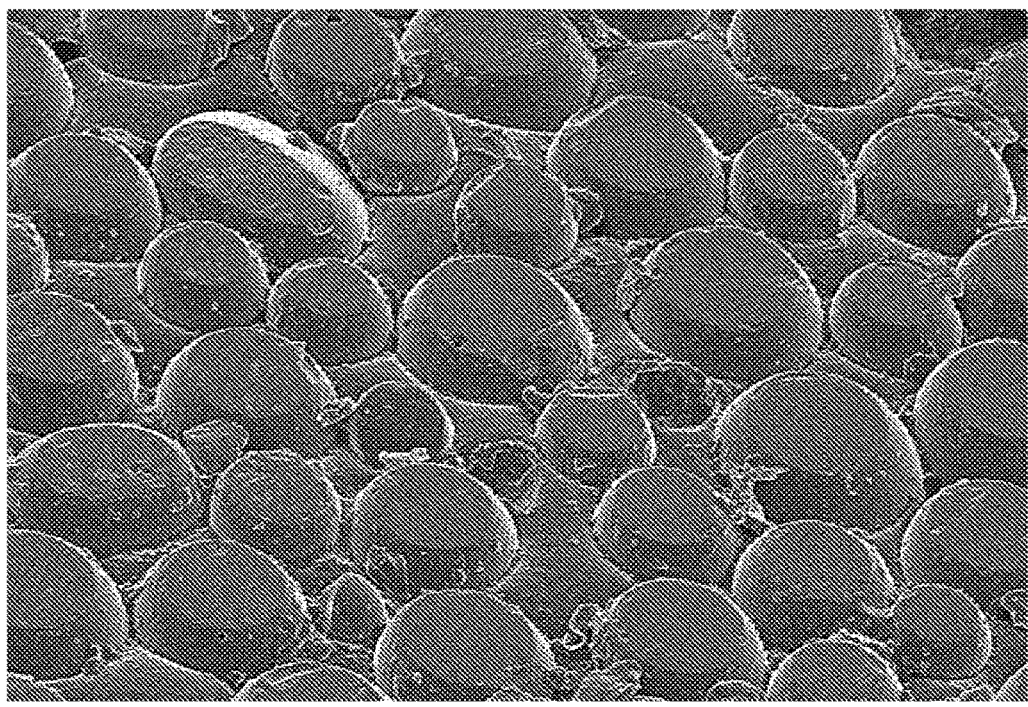
FIG. 3 is a scanning electron micrograph of the microsphere layer surface of example 1.

EX-1 was prepared as described above in CE-1 except that the resulting beaded film was abraded using an abrasive pad (1.0 Micron Sheet, obtained from 3M Company, Saint Paul, Minn. under trade designation "3M LAPPING FILM ALUMINUM OXIDE 262X") on a Buehler polishing apparatus (used in manual mode available from Buehler LTD, Lake Bluff, Ill.) in the presence of water on the surface of the EX-1 film. The EX-1 film was positioned over a wet, smooth glass surface before polishing to hold it in place during polishing. The abrasive pad was mounted on a conformable foam padding that had a thin adhesive layer on both sides. After only a few minutes of light polishing by hand the surface was changed, resulting in the beadfilm of EX-1. A scanning electron micrograph (SEM) of beaded surface of EX-1 is shown in FIG. 3.

Haze, clarity, % transmittance and pencil hardness of CE-1 and EX-1 samples were determined using the test methods described above and are recorded in Table 2, below.

TABLE 2

| Example | Haze % | Clarity | % Transmittance | Pencil Hardness |
|---------|--------|---------|-----------------|-----------------|
| CE-1    | 97     | 9.2     | 96              | >9 H            |
| EX-1    | 82     | 67.3    | 93              | >9 H            |

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosure in any document incorporated by reference herein, this specification will control.

What is claimed is:

1. A construction comprising:
   a microsphere layer comprising a plurality of microspheres, wherein the plurality of microspheres consists essentially of glass, ceramic, or glass-ceramic; and
   a bead bonding layer, wherein the plurality of microspheres is partially embedded in the bead bonding layer forming a first outermost surface of the construction, the first outermost surface comprising exposed microspheres embedded in the bead bonding layer, wherein at least a portion of the exposed microspheres on the first outermost surface are truncated at the first outermost surface.

2. The construction of claim 1, wherein the plurality of microspheres are substantially planarized across the first outermost surface.

3. The construction of claim 2, wherein the plurality of microspheres are truncated by a latitudinal plane parallel to the bead bonding layer.

4. The construction of claim 1, wherein a difference between the refractive index of the bead bonding layer and the refractive index of the plurality of microspheres is less than 0.05.

5. The construction of claim 1, wherein only a portion of the plurality of microspheres on the first surface are truncated.

6. The construction of claim 1, wherein the difference in height of the apex of each microsphere in the plurality of microspheres is within 20 micrometers.

7. The construction of claim 1, wherein the average height difference along the first outermost surface between the surface of the bead bonding layer and the top of the truncated microspheres in the plurality of microspheres is at least 0.1 micrometers.

8. The construction of claim 1, wherein the plurality of microspheres are embedded no more than 80% of their average diameter in the bead bonding layer.

9. The construction of claim 1, wherein the plurality of microspheres are transparent.

10. The construction of claim 1, wherein the plurality of microspheres have a refractive index of less than 1.60.

11. The construction of claim 1, wherein the microsphere layer is a monolayer of microspheres.

12. The construction of claim 1, wherein the first outermost surface is substantially free of a coating.

13. The construction of claim 1, wherein the bead bonding layer comprises at least one of: a polyurethane, polyesters, (meth)acrylic acid ester polymers, an epoxy, a (meth)acrylate, polyvinylchloride polymer, polyvinyl acetate polymer, polyamides, a urethane/(meth)acrylate, a silicone, polyolefin, acrylobutadiene polymers, fluoropolymers, and blends thereof.

14. An article comprising the construction of claim 1.

15. A method of making a construction comprising:
   (i) obtaining a microsphere layer comprising a plurality of microspheres, wherein the plurality of microspheres consists essentially of glass, ceramic, or glass-ceramic; and a bead bonding layer, wherein the plurality of microspheres is partially embedded in the bead bonding layer forming a first outermost surface of the construction, the first outermost surface comprising exposed microspheres embedded in the bead bonding layer; and
   (ii) abrading the first outermost surface to truncate at least a portion of the plurality of microspheres at the first outermost surface.

16. The method of claim 15, wherein abrading is performed with an abrasive particle selected from diamond, silicon carbide, and cubic boron nitride.

17. The method of claim 15, wherein a lubricant is used during the abrading step.

18. The method of claim 15, wherein the first outermost surface is contacted with diamond lapping film.

19. The method of claim 15, wherein the first outermost surface is contacted with a 3D abrasive construction.

20. The method of claim 15, wherein the abrading step comprises a plurality of abrading steps with an increasing degree of polish.

* * * * *

UNITED STATES PATENT AND TRADEMARK OFFICE
CERTIFICATE OF CORRECTION

PATENT NO. : 11,112,544 B2
APPLICATION NO. : 16/323281
DATED : September 7, 2021
INVENTOR(S) : John Clark It is certified that error appears in the above-identified patent and that said Letters Patent is hereby corrected as shown below:

In the Claims

<u>Column 33</u>
Line 50 (approx.), In Claim 5, after "the first", insert --outermost--.

Signed and Sealed this
Tenth Day of May, 2022

Katherine Kelly Vidal
*Director of the United States Patent and Trademark Office*